(12) United States Patent
Wang et al.

(10) Patent No.: US 12,374,996 B2
(45) Date of Patent: Jul. 29, 2025

(54) CONTROL METHOD, DEVICE, AND SYSTEM FOR SYNCHRONOUS BUCK CIRCUIT, AND ELECTRONIC DEVICE

(71) Applicant: ECOFLOW INC., Shenzhen (CN)

(72) Inventors: Lei Wang, Shenzhen (CN); Xi Chen, Shenzhen (CN)

(73) Assignee: ECOFLOW INC., Shenzhen (CN)

( * ) Notice: Subject to any disclaimer, the term of this patent is extended or adjusted under 35 U.S.C. 154(b) by 259 days.

(21) Appl. No.: 17/949,838

(22) Filed: Sep. 21, 2022

(65) Prior Publication Data

US 2023/0011390 A1 Jan. 12, 2023

Related U.S. Application Data

(63) Continuation of application No. PCT/CN2021/110805, filed on Aug. 5, 2021.

(30) Foreign Application Priority Data

Mar. 11, 2021 (CN) .......................... 202110263634.6

(51) Int. Cl.
*H02M 3/158* (2006.01)
*H02M 1/00* (2007.01)
*H02M 3/157* (2006.01)

(52) U.S. Cl.
CPC ........ *H02M 3/1588* (2013.01); *H02M 1/0032* (2021.05); *H02M 1/0054* (2021.05); *H02M 3/157* (2013.01)

(58) Field of Classification Search
CPC ............. H02M 1/0009; H02M 1/0032; H02M 1/0035; H02M 1/0048; H02M 1/0054; H02M 3/156–1588
See application file for complete search history.

(56) References Cited

U.S. PATENT DOCUMENTS 9,124,177 B2 * 9/2015 Zhu ..................... H02M 3/1588
10,715,039 B1 * 7/2020 Ilango ................. G01R 19/175
(Continued)

FOREIGN PATENT DOCUMENTS

CN 106374748 A 2/2017
CN 111697828 A 9/2020
(Continued)

OTHER PUBLICATIONS

Texas Instruments, "Understanding Buck Power Stages in Switchmode Power Supplies," Application Report SLVA057, Mar. 1999 Obtained on Jul. 18, 2024. Available: https://www.ti.com/lit/an/slva057/slva057.pdf (Year: 1999).*

(Continued)

*Primary Examiner* — Fred E Finch, III
(74) *Attorney, Agent, or Firm* — ANOVA LAW GROUP, PLLC

(57) ABSTRACT

A control method for a synchronous BUCK circuit is disclosed, including: obtaining an input voltage, an output voltage and an output current of the synchronous BUCK circuit; obtaining a current state of the synchronous switch transistor; obtaining a turn-off current threshold when the synchronous switch transistor is in an on state; switching the synchronous switch transistor to an off state when the output current is less than the turn-off current threshold; calculating a duty ratio of a main switch transistor according to the input voltage, the output voltage and the turn-off current threshold; and generating a corresponding driving signal according to the duty ratio, to control the synchronous BUCK circuit.

16 Claims, 6 Drawing Sheets

(56) References Cited

U.S. PATENT DOCUMENTS

| | | | | |
|---|---|---|---|---|
| 2008/0010474 | A1* | 1/2008 | Chapuis | H02M 3/157 |
| | | | | 713/300 |
| 2008/0084721 | A1 | 4/2008 | Miramonti et al. | |
| 2008/0284398 | A1* | 11/2008 | Qiu | H02M 3/156 |
| | | | | 323/283 |
| 2011/0101948 | A1* | 5/2011 | Lopata | H02M 3/1588 |
| | | | | 323/283 |
| 2011/0273157 | A1* | 11/2011 | Abu-Qahouq | H02M 3/1588 |
| | | | | 323/299 |
| 2013/0063114 | A1 | 3/2013 | Agrawal et al. | |
| 2013/0169172 | A1* | 7/2013 | Kesterson | H05B 45/38 |
| | | | | 315/186 |
| 2015/0097544 | A1* | 4/2015 | Bizjak | H02M 3/156 |
| | | | | 323/284 |

FOREIGN PATENT DOCUMENTS

| | | |
|---|---|---|
| CN | 112636598 A | 4/2021 |
| JP | 2016208759 A | 12/2016 |
| JP | 2018057203 A | 4/2018 |

OTHER PUBLICATIONS

Zhou, X. et al., "Improved Light-Load Efficiency for Synchronous Rectifier Voltage Regulator Module," in IEEE Transactions on Power Elec., vol. 15, No. 5, pp. 826-834, Sep. 2000, doi: 10.1109/63.867671. (Year: 2000).*

Mohan, N. et al., "Power Electronics: Converters, Applications, and Design". Hoboken, NJ: Wiley, 2003, pp. 161-179. (Year: 2003).*

The World Intellectual Property Organization (WIPO) International Search Report for PCT/CN2021/110805 Nov. 17, 2021 7 Pages (with translation).

The European Patent Office (EPO) The Extended European Search Report for 21825519.8, Jul. 16, 2024 11 Pages.

Leandro Roggia et al. "Digital control system applied to a PFC boost converter operating in mixed conduction mode." 2009 Brazilian Power Electronics Conference. IEEE, 2009.

Xunwei Zhou et al. "Improved light-load efficiency for synchronous rectifier voltage regulator module." IEEE Transactions on Power Electronics 15.5 (2000): 826-834.

Hoai Nam Le et al. "Efficiency improvement at light load in bidirectional DC-DC converter by utilizing discontinuous current mode." 2015 17th European Conference on Power Electronics and Applications (EPE'15 ECCE-Europe). IEEE, 2015.

The European Patent Office (EPO) Communication from the Examining Division for Application No. 21825519.8 Feb. 14, 2025 7 Pages.

* cited by examiner

CONTROL METHOD, DEVICE, AND SYSTEM FOR SYNCHRONOUS BUCK CIRCUIT, AND ELECTRONIC DEVICE

CROSS-REFERENCE TO RELATED APPLICATIONS

This application is a continuation application of PCT Application No. PCT/CN2021/110805, filed Aug. 5, 2021, which claims priority to Chinese Patent Application No. 202110263634.6, filed with the Chinese Patent Office on Mar. 11, 2021, and entitled "CONTROL METHOD, DEVICE, AND SYSTEM FOR SYNCHRONOUS BUCK CIRCUIT, AND ELECTRONIC DEVICE", all of which is incorporated herein by reference in its entirety.

TECHNICAL FIELD

This application relates to the technical field of circuit control and, in particular, to a control method, device, and system for a synchronous BUCK circuit, and an electronic device.

BACKGROUND

A BUCK circuit is a step-down circuit, which adopts a DC-DC circuit structure to realize a step-down conversion from DC to DC. The BUCK circuit is widely used in various circuits. In order to improve efficiency, a synchronous transistor is often used for freewheeling when a large current is output. In the case of a small current and light load, in order to reduce loss caused by a reactive current, a synchronous switch transistor does not work and a diode is used for freewheeling. In the case of small current and light load, the BUCK circuit often works in a discontinuous conduction mode. Especially when the synchronous transistor switches between different working states, there is also a sudden switch between the discontinuous conduction mode and a continuous conduction mode. Due to a large difference between output/input gains of the BUCK circuit in the two modes, the BUCK circuit produces a large impulse current, and the output of the circuit also has transient overshoot or drop and the like.

SUMMARY

According to various embodiments of the present disclosure, a control method, device and system for a synchronous BUCK circuit, and an electronic device are provided.

The embodiments of the present disclosure provide a control method for a synchronous BUCK circuit, including: obtaining an input voltage, an output voltage and an output current of the synchronous BUCK circuit; obtaining a current state of a synchronous switch transistor in the synchronous BUCK circuit; obtaining a turn-off current threshold when the synchronous switch transistor is in an on state; switching the synchronous switch transistor to an off state when the output current is less than the turn-off current threshold; calculating a duty ratio of a main switch transistor in the synchronous BUCK circuit according to the input voltage, the output voltage and the turn-off current threshold; and generating a corresponding driving signal according to the duty ratio, to control the synchronous BUCK circuit.

The embodiments of the present disclosure provide a control method for a synchronous BUCK circuit, including: obtaining an input voltage, an output voltage and an output current of the synchronous BUCK circuit; obtaining a current state of a synchronous switch transistor in the synchronous BUCK circuit; obtaining a turn-off current threshold when the synchronous switch transistor is in an on state; switching the synchronous switch transistor to an off state when the output current is less than the turn-off current threshold; calculating, based on a first duty ratio formula, a duty ratio of a main switch transistor in the synchronous BUCK circuit according to the input voltage, the output voltage and the turn-off current threshold; and generating a corresponding driving signal according to the duty ratio, to control the synchronous BUCK circuit, where the first duty ratio formula is:

$$D = \frac{V_{out}}{V_{in} - V_{out}} \sqrt{\frac{2L \cdot I_x}{V_{out} \cdot T_s}}$$

where D is the duty ratio of the main switch transistor; $V_{in}$ is a currently sampled input voltage; $V_{out}$ is a currently sampled output voltage; L is an inductance value of an inductor in the synchronous BUCK circuit; $I_x$ is the turn-off current threshold; and $T_s$ is a switching cycle of the main switch transistor.

The embodiments of the present disclosure provide a synchronous BUCK circuit system, including: a synchronous BUCK circuit and a control device, where the control device is configured to control the synchronous BUCK circuit; the synchronous BUCK circuit includes a main switch transistor, an inductor, a synchronous switch transistor, an energy-storage capacitor and a sampling circuit; the sampling circuit is configured to collect an input voltage, an output voltage and an output current of the synchronous BUCK circuit and output to the control device; the main switch transistor has a first terminal connected to a positive electrode of a power supply, a second terminal connected to a first terminal of the inductor, and a control terminal connected to the control device; the synchronous switch transistor has a first terminal connected to the second terminal of the main switch transistor and the first terminal of the inductor, a second terminal connected to a negative electrode of the power supply, and a control terminal connected to the control device; a second terminal of the inductor is connected to a positive electrode of the energy-storage capacitor, a negative electrode of the energy-storage capacitor is connected to the negative electrode of the power supply, and both terminals of the energy-storage capacitor are further connected to a load in parallel. The control device includes an obtaining module, configured to obtain the input voltage, the output voltage and the output current of the synchronous BUCK circuit, obtain a current state of the synchronous switch transistor in the synchronous BUCK circuit, and further obtain a turn-off current threshold when the synchronous switch transistor is in an on state; a switching module, configured to switch the synchronous switch transistor to an off state when the output current is less than the turn-off current threshold; a calculating module, configured to calculate a duty ratio of the main switch transistor in the synchronous BUCK circuit according to the input voltage, the output voltage and the turn-off current threshold; and a driving control module, configured to generate a corresponding driving signal according to the duty ratio, to control the synchronous BUCK circuit.

The embodiments of the present disclosure provide an electronic device, wherein the electronic device includes a synchronous BUCK circuit system according to the foregoing embodiments.

The details of one or more embodiments of the present disclosure are put forward in the accompanying drawings and descriptions below. Other features, objectives, and advantages of the present disclosure will become apparent from the specification, the accompanying drawings, and the claims.

BRIEF DESCRIPTION OF THE DRAWINGS

In order to describe technical solutions of the present disclosure more clearly, the following briefly introduces the accompanying drawings that need to be used in embodiments. It should be understood that the following accompanying drawings only show some embodiments of the present disclosure, which therefore should not be regarded as limiting protection scope of the present disclosure. In the accompanying drawings, similar components are marked with similar numbers.

DETAILED DESCRIPTION

The technical solutions in embodiments of the present disclosure are described below with reference to the accompanying drawings in the embodiments of the present disclosure. Apparently, the described embodiments are merely some rather than all of the embodiments of the present disclosure.

Components of the embodiments of the present disclosure, which are generally described and shown in the accompanying drawings herein, may be arranged and designed in various configurations. Therefore, the following detailed description of the embodiments of the present disclosure provided in the accompanying drawings is not intended to limit the scope of the present disclosure for which protection is claimed, but only represents the selected embodiments of the present disclosure. Based on the embodiments of the present disclosure, all other embodiments obtained by persons of skill in the art without creative efforts shall fall within the protection scope of the present disclosure.

Unless otherwise defined, terms used herein (including technical terms and scientific terms) have the same meanings as those generally understood by persons of ordinary skill in the art to which various embodiments of the present disclosure belong. The terms (such as those defined in dictionaries in general use) will be interpreted as having the same meaning as a contextual meaning in the relevant field of technology and will not be interpreted as having an idealized meaning or excessively formal meaning, unless clearly defined in various embodiments of the present disclosure.

Figure 1:
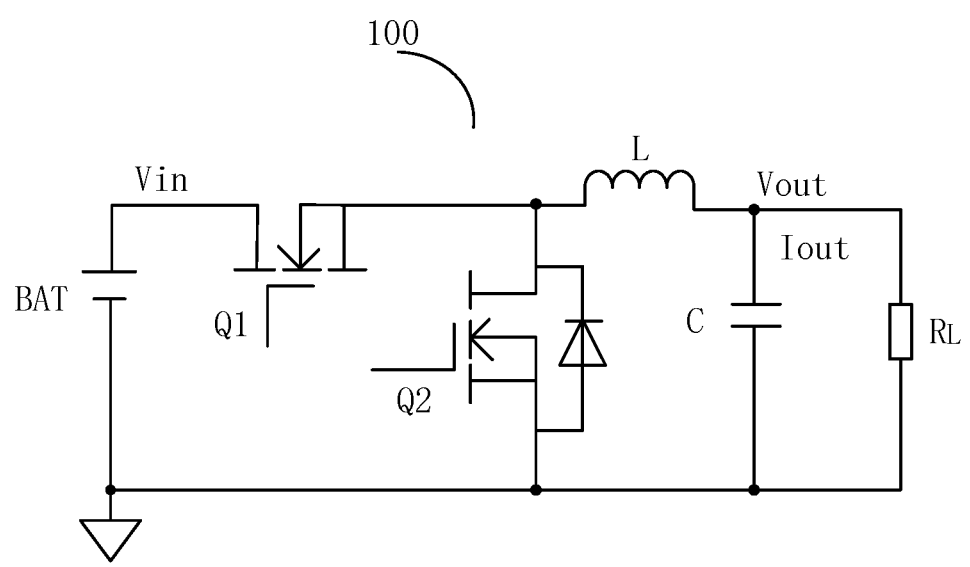
FIG. 1 is a schematic structural diagram of a synchronous BUCK circuit according to an embodiment of the present disclosure.
Figure 2:
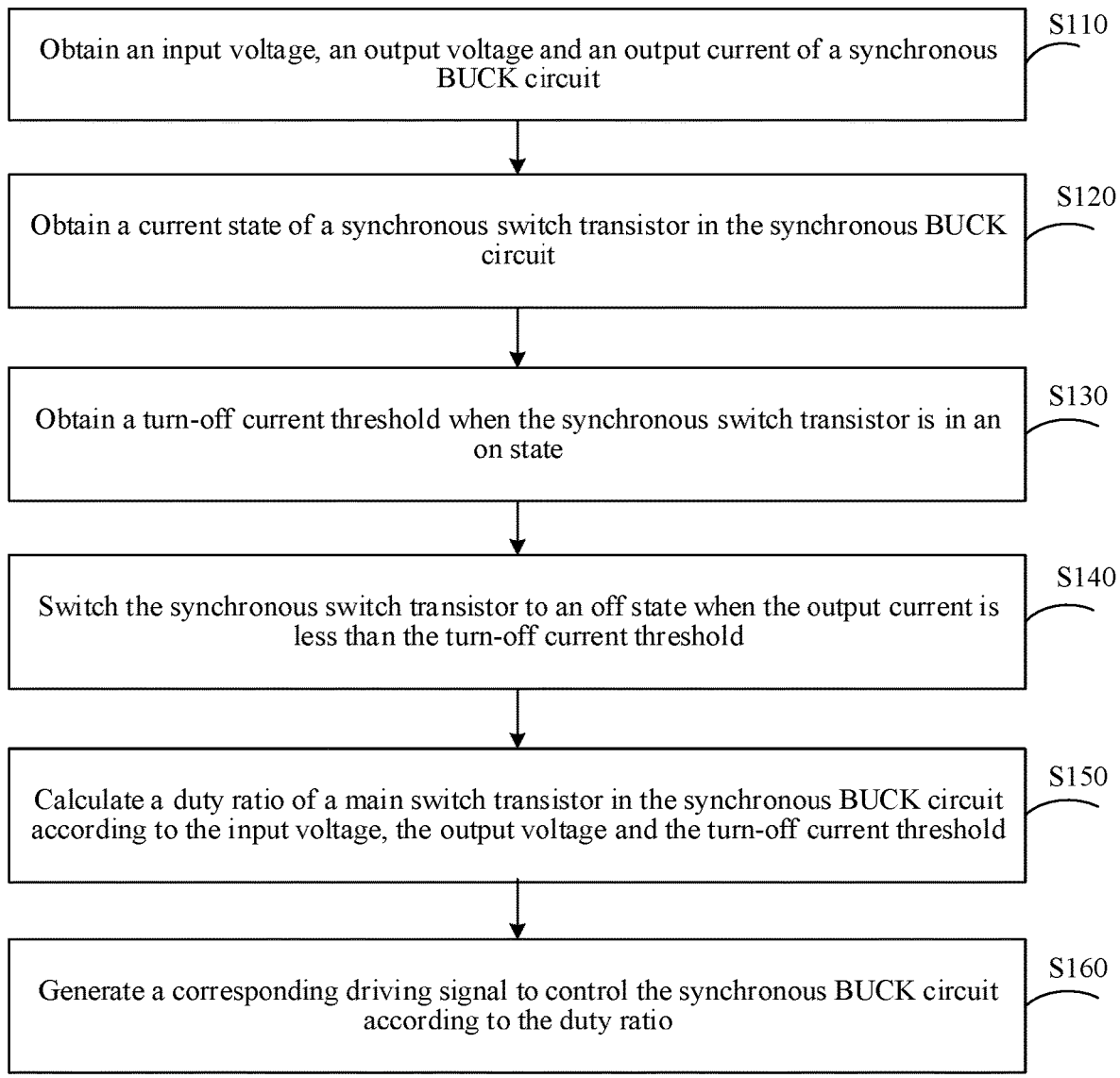
FIG. 2 is a first schematic flowchart of a control method for a synchronous BUCK circuit.

Referring to FIG. 1 and FIG. 2, embodiments of the present disclosure provide a control method for a synchronous Buck circuit, which can reduce a dynamic impact generated when a switch transistor is turned on/off in a circuit, so as to improve circuit performance.

As shown in FIG. 1, the synchronous BUCK circuit 100 includes a main switch transistor Q1, an inductor L, a synchronous switch transistor Q2 and an energy-storage capacitor C, where the main switch transistor Q1 has a first terminal connected to a positive electrode of a power supply BAT, a second terminal connected to a first terminal of the inductor L, and a control terminal connected to a control device; the synchronous switch transistor Q2 has a first terminal connected to the second terminal of the main switch transistor Q1 and the first terminal of the inductor L, a second terminal connected to a negative electrode of the power supply, and a control terminal connected to the control device; a second terminal of the inductor L is connected to a positive electrode of the energy-storage capacitor C, and a negative electrode of the energy-storage capacitor C is connected to the negative electrode of the power supply BAT. Both terminals of the energy-storage capacitor C are further connected to a load $R_L$ to provide corresponding energy for the load $R_L$.

For example, the main switch transistor Q1 and the synchronous switch transistor Q2 can be realized by MOS transistors. It can be understood that the synchronous switch transistor Q2 in the above synchronous BUCK circuit uses a rectifier MOS transistor with a low on-resistance to replace a freewheeling diode in the general BUCK circuit so as to reduce a rectification loss of the circuit, which can greatly improve circuit transformation efficiency.

It should be understood that in the case of a low current and light load, a body diode in the synchronous switch transistor Q2 shown in FIG. 1 can be used to realize a freewheeling effect of the synchronous BUCK circuit in a discontinuous conduction mode. Generally, the above synchronous switch transistor Q2 has a parasitic diode (namely, the body diode). In some other cases, the body diode in the synchronous switch transistor Q2 can further be replaced by an external independent diode.

Considering that the conventional synchronous BUCK circuit has a sudden switch between a discontinuous conduction mode and a continuous conduction mode when the synchronous switch transistor Q2 is turned on or off, which easily causes a large dynamic impact. In the discontinuous conduction mode, a current flowing through the inductor in the BUCK circuit gradually decreases to 0 after the main switch transistor Q1 is off for a period of time. In the continuous conduction mode, the current flowing through the inductor does not drop to 0 during each cycle. Therefore, in one embodiment, with reference to the magnitude of the output current and a status of the synchronous switch transistor Q2, a duty ratio of the main switch transistor Q1 is predicted and controlled at different times, thereby controlling the main switch transistor Q1 and the synchronous switch transistor Q2 according to a predicted value so as to reduce the dynamic impact generated in the circuit.

As shown in FIG. 2, a control method for a synchronous BUCK circuit is described in detail below. It can be understood that the synchronous BUCK circuit in FIG. 1 is a basic circuit, and the control method can also be applied to other varied synchronous BUCK circuits.

Step S110. Obtain an input voltage, an output voltage and an output current of the synchronous BUCK circuit 100.

For example, a corresponding sampling circuit may be arranged at a corresponding position. For example, a sampling unit is arranged at an input terminal of the synchronous BUCK circuit 100 to sample a connected power supply voltage $V_{in}$. Specifically, the sampling unit may include a divider resistor, an analog-to-digital converter (ADC) and the like. Another sampling unit may be arranged at an output terminal of the circuit to sample the output current Tout and the output voltage $V_{out}$. For example, a current transformer and the like may be used to sample the output current. It can be understood that a specific structure of the sampling circuit here may be selected according to an actual demand, which is not limited here.

Step S120. Obtain a current state of a synchronous switch transistor Q2.

Step S130. Obtain a turn-off current threshold when the synchronous switch transistor Q2 is in an on state.

There are two states of the synchronous switch transistor Q2, that is, the on state and an off state. The on state may also be referred to as a turn-on state, and the off state may also be referred to as a cut-off state or a turn-off state. In addition, in one embodiment, two current thresholds are specified, that is, the turn-off current threshold and a turn-on current threshold. The turn-off current threshold is less than the turn-on current threshold. The turn-on current threshold and the turn-off current threshold determine a turn-on moment and a turn-off moment of the synchronous switch transistor Q2 respectively.

For example, if the synchronous switch transistor Q2 is in the on state at present, the turn-off current threshold is obtained, which is used to, in combination with the output current, determine whether the synchronous switch transistor Q2 needs to be turned off at present. For example, if the present output current is less than the turn-off current threshold, the synchronous switch transistor Q2 is controlled to switch from the present on state to the off state, that is, step S140 is performed; otherwise, the present on state is maintained.

Step S140. Switch the synchronous switch transistor Q2 to the off state when the output current is less than the turn-off current threshold.

Step S150. Calculate a duty ratio of a main switch transistor Q1 according to the input voltage, the output voltage and the turn-off current threshold.

For example, when the synchronization switch transistor Q2 is turned off, the synchronous BUCK circuit enters a discontinuous conduction mode. In this case, according to a gain characteristic of the discontinuous conduction mode of the synchronous BUCK circuit, the present duty ratio of the main switch transistor Q1 may be calculated according to the following first duty ratio formula. The first duty ratio formula is:

$$D = \frac{V_{out}}{V_{in} - V_{out}} \sqrt{\frac{2L \cdot I_x}{V_{out} \cdot T_s}}.$$

D is the duty ratio of the main switch transistor; $V_{in}$ is a currently sampled input voltage; $V_{out}$ is a currently sampled output voltage; L is an inductance value of the inductor in the synchronous BUCK circuit; $I_x$ is the turn-off current threshold; and $T_s$ is a switching cycle of the main switch transistor Q1.

Step S160. Generate a corresponding driving signal according to the duty ratio, to control the synchronous BUCK circuit 100.

After the duty ratio of the main switch transistor Q1 is calculated, a corresponding PWM driving signal may be generated according to the duty ratio, so as to control the main switch transistor Q1 and the synchronous switch transistor Q2. Because the duty ratio is predicted according to the next working mode of the main switch transistor Q1, directly using the predicted duty ratio to control the main switch transistor Q1 can reduce a current impact generated by the main switch transistor Q1 during the switching between the two working modes of CCM (continuous conduction mode) and DCM (discontinuous conduction mode), thereby improving reliability and output performance of the main switch transistor Q1.

It can be understood that when the synchronous BUCK circuit works in the discontinuous conduction mode, and the main switch transistor Q1 is turned on, the synchronous switch transistor Q2 is tuned off, and in this case, the inductor L stores energy; when the main switch transistor Q1 is turned off, the electric energy stored on the inductor L continues to flow through a body diode or an external diode in the synchronous switch transistor Q2.

Figure 3:
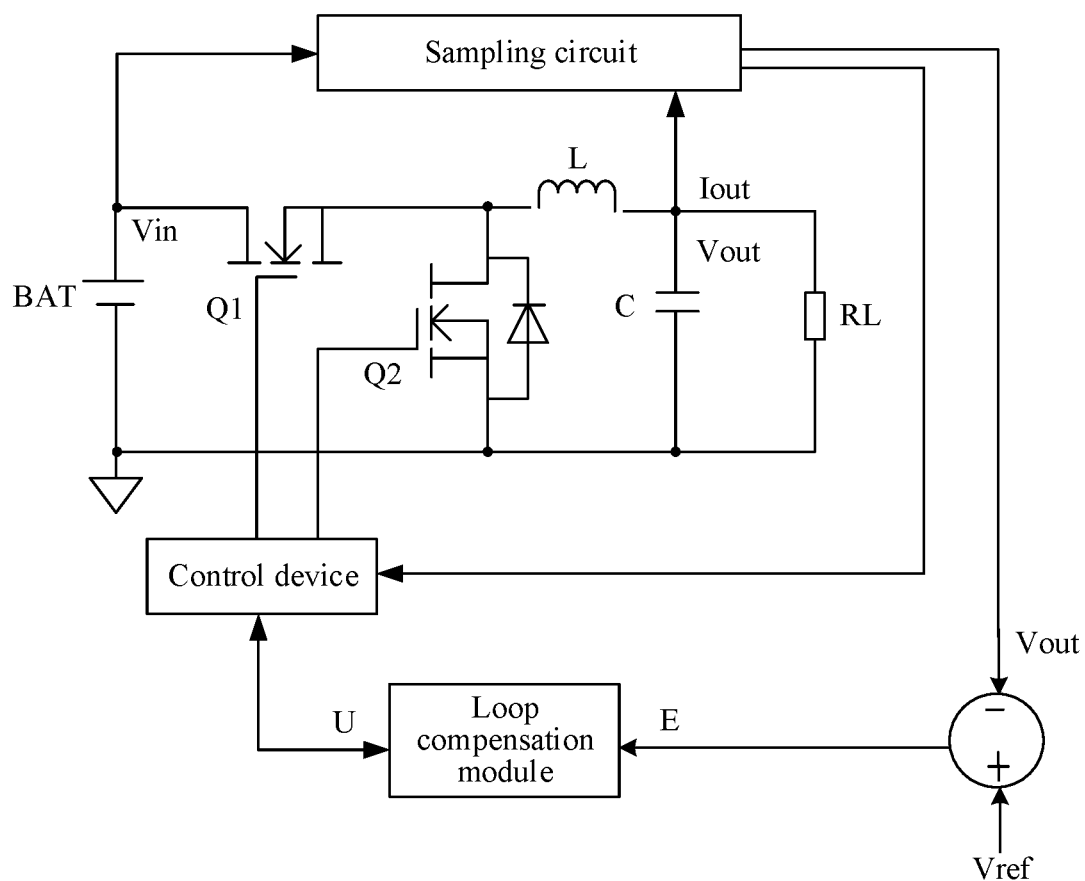
FIG. 3 is a schematic structural diagram of a synchronous BUCK circuit with a loop compensation module according to an embodiment.

Generally, the synchronous BUCK circuit 100 may be controlled by a variety of control technologies, such as voltage mode control, average current control or peak current control. In a practical project, an appropriate control method may be selected according to different demands. As shown in FIG. 3, in an embodiment, the synchronous BUCK circuit 100 further includes a loop compensation module. A deviation E between a sampled output voltage $V_{out}$ and a preset reference voltage Vref is taken as an input of the loop compensation module. The output voltage is adjusted according to an output voltage U used as an adjustment amount for correcting the deviation. In other embodiments, the loop compensation module may further include a current loop structure. The output voltage U is used as a given value of the current loop, and then a corresponding duty ratio control signal is generated after control and adjustment according to the given value and the output current.

The loop compensation module is provided with a corresponding discrete domain difference equation. The duty ratio of the main switch transistor Q1 or an intermediate quantity that can be used to solve the duty ratio can be calculated according to the discrete domain difference equation. For example, an expression of the discrete domain difference equation is:

$$U(n)=A_1U(n-1)+\ .\ .\ .\ +A_iU(n-i)+B_1E(n)+B_2E(n-1)+\ .\ .\ .+B_jE(n-j).$$

U represents the duty ratio or the intermediate quantity for calculating the duty ratio; n represents a current sample; n−1 represents a previous sample; E represents the deviation between the output voltage and the reference voltage; i and j are integers greater than or equal to 2; and $A_1$, $A_i$, $B_1$, $B_2$ and $B_j$ represent gain coefficients of corresponding terms respectively. It is understandable that if one of these terms does not exist, the gain coefficient of the corresponding term is 0. That is, an output of the difference equation is not affected by this term.

Figure 4:
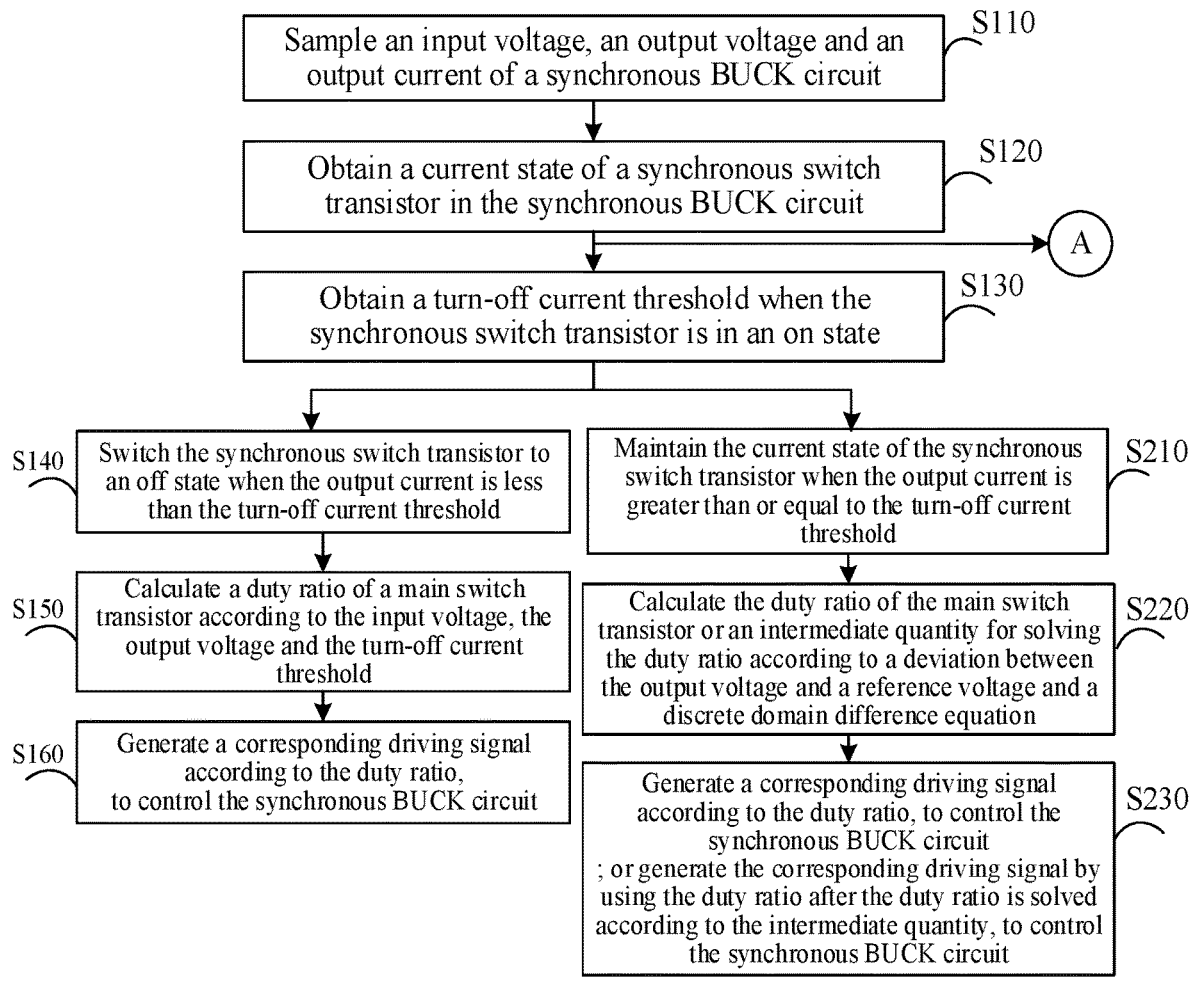
FIG. 4 is a second schematic flowchart of a control method for a synchronous BUCK circuit according to an embodiment of the present disclosure.

As shown in FIG. 4, further, the control method for a synchronous BUCK circuit further includes the following steps:

Step S210. Maintain a current state of the synchronous switch transistor Q2 when the synchronous switch transistor Q2 is in the on state and the output current is greater than or equal to the turn-off current threshold.

For example, at a current sampling moment, if the synchronous switch transistor Q2 is in the on state and the present output current is greater than or equal to the turn-off current threshold, the synchronous switch transistor Q2 is controlled to continue to stay in the on state. In this case, the duty ratio of the main switch transistor Q1 can be calculated according to the above discrete domain difference equation. That is, a conventional duty ratio determining method is used to determine the duty ratio or the intermediate quantity for determining the duty ratio.

Step S220. Calculate the duty ratio of the main switch transistor Q1 or the intermediate quantity for solving the duty ratio according to the deviation between the output voltage and the reference voltage and the discrete domain difference equation.

Because different loop compensation structures have different discrete domain difference equations, the duty ratio or the intermediate quantity for solving the duty ratio specifically can be calculated according to an actual demand. For example, taking a PID loop compensation structure of a voltage mode control method as an example, a corresponding difference equation is expressed as follows:

$$U(n)=U(n-1)+B_1E(n)+B_2E(n-1)+B_3E(n-2).$$

U(n) represents a currently outputted intermediate quantity for calculating the duty ratio and is a control voltage; U(n−1) represents a previous output, that is, a previous historical intermediate quantity; E(n) represents a deviation value between the currently sampled output voltage and the reference voltage; and E(n−1) and E(n−2) represent historical deviation values of last two times respectively.

For another example, in another current loop PI control method, a corresponding difference equation can directly output a duty ratio of a PWM signal, which is not described here. After the duty ratio is calculated, the two switch transistors in the synchronous BUCK circuit 100 can be controlled accordingly. It can be understood that for different types of loop controllers, such as PI control, PD control or PID control, the expression of the corresponding difference equation also tends to be different.

Step S230. Generate the corresponding driving signal according to the duty ratio, to control the synchronous BUCK circuit 100, or generate the corresponding driving signal by using the duty ratio after the duty ratio is solved according to the intermediate quantity, to control the synchronous BUCK circuit 100.

For example, if the difference equation can directly output the duty ratio, the control device can generate the corresponding PWM driving signal according to the duty ratio so as to drive and control the main switch transistor Q1 and the synchronous switch transistor Q2. If the difference equation outputs the intermediate quantity, such as the above control voltage and the like, the control device can convert the intermediate quantity into the duty ratio of the main switch transistor Q1, and then output the corresponding PWM driving signal.

Figure 5:
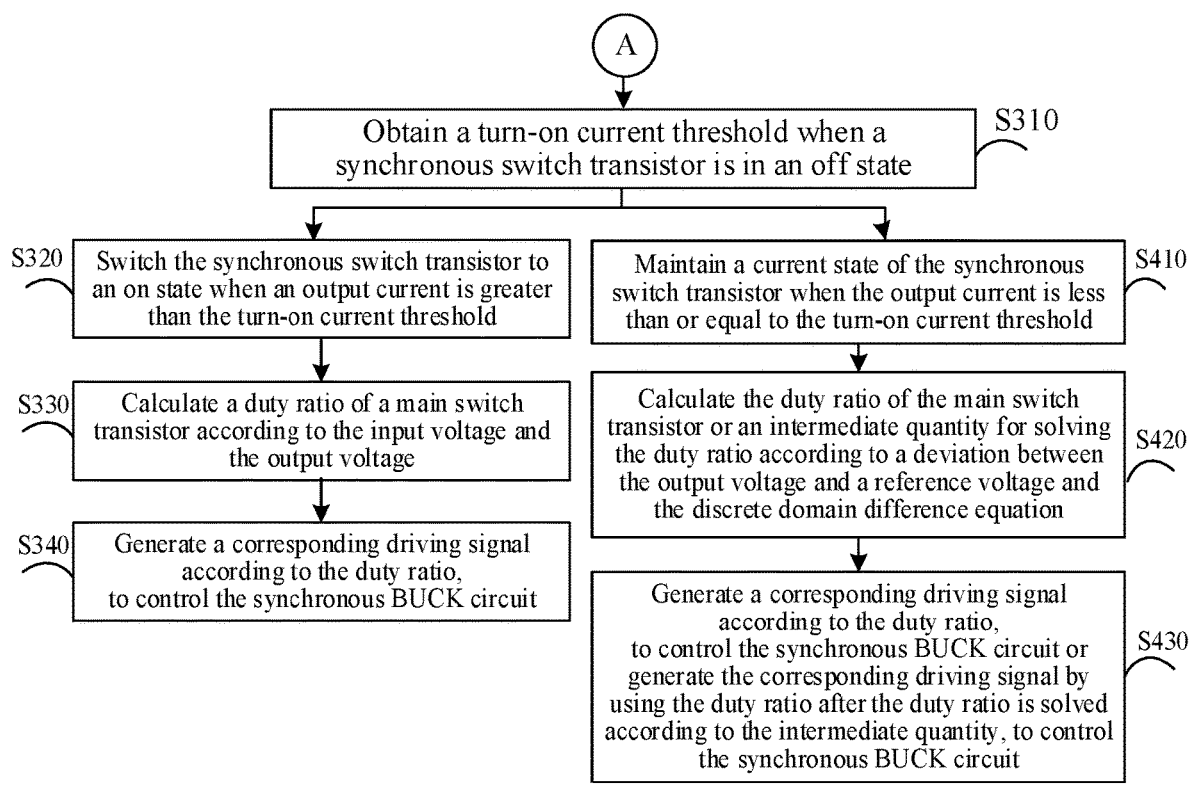
FIG. 5 is a third schematic flowchart of a control method for a synchronous BUCK circuit according to an embodiment of the present disclosure.

Further, as shown in FIG. 5, for the above step S120, because the synchronous switch transistor Q2 may be in an off state, in this case, a turn-on current threshold is used as a reference. For different output current values, different methods can be used to calculate the duty ratio of the main switch transistor Q1. After the above step S120, the control method for a synchronous BUCK circuit further includes the following steps:

Step S310. Obtain a turn-on current threshold when the synchronous switch transistor Q2 is in the off state.

Step S320. Switch the synchronous switch transistor Q2 to the on state when the output current is greater than the turn-on current threshold.

For example, if the synchronous switch transistor Q2 is in the off state at present, the turn-on current threshold is obtained, which is used to, in combination with the output current, determine whether the synchronous switch transistor Q2 needs to be turned on at present. For example, if the present output current is greater than the turn-on current threshold, the synchronous switch transistor Q2 is controlled to switch from the present off state to the on state, that is, step S320 is performed; otherwise, the present off state is maintained.

Step S330. Calculate a duty ratio of the main switch transistor Q1 according to the input voltage and the output voltage.

For example, after the synchronous switch transistor Q2 is turned on, the synchronous BUCK circuit enters a continuous conduction mode. In this case, according to a gain characteristic of the continuous conduction mode of the synchronous BUCK circuit, the duty ratio of the main switch transistor Q1 may be calculated according to the following second duty ratio formula. The second duty ratio formula is:

$$D = \frac{V_{out}}{V_{in}}.$$

D is the duty ratio of the main switch transistor; $V_{in}$ is a currently sampled input voltage; and $V_{out}$ is a currently sampled output voltage.

Step S340. Generate a corresponding driving signal according to the duty ratio, to control the synchronous BUCK circuit 100.

After the duty ratio of the main switch transistor Q1 is calculated, a corresponding PWM driving signal may be generated according to the duty ratio so as to control the main switch transistor Q1 and the synchronous switch transistor Q2. Because the duty ratio is predicted according to a next working mode of the main switch transistor Q1, directly using the predicted duty ratio to control the main switch transistor Q1 can reduce a current impact generated by the main switch transistor Q1 during the mode switching, thereby improving reliability and output performance of the main switch transistor Q1.

Further, as shown in FIG. 5, the control method for a synchronous BUCK circuit further includes the following steps:

Step S410. Maintain a current state of the synchronous switch transistor Q2 when the synchronous switch transistor Q2 is in the off state and the output current is less than or equal to the turn-on current threshold.

Step S420. Calculate the duty ratio of the main switch transistor Q1 or the intermediate quantity for solving the duty ratio according to the deviation between the output voltage and the reference voltage and the discrete domain difference equation.

For example, at a current sampling moment, if the synchronous switch transistor Q2 is in the off state and the present output current is less than or equal to the turn-on current threshold, the time to turn on the synchronous switch transistor Q2 has not yet arrived. Therefore, the current off state is maintained until the output current is greater than the turn-on current threshold, and then the synchronous switch transistor Q2 is controlled to be turned on.

Step S430. Generate the corresponding driving signal according to the duty ratio, to control the synchronous BUCK circuit 100; or generate the corresponding driving signal by using the duty ratio after the duty ratio is solved according to the intermediate quantity, to control the synchronous BUCK circuit 100.

Similarly, after the duty ratio is calculated, the duty ratio is used to control the synchronous BUCK circuit 100. This step is the same as the above step S230 and the description is not repeated here.

Optionally, after the step of calculating the duty ratio of the main switch transistor Q1 according to a first duty ratio formula or a second duty ratio formula above, the method further includes:

adjusting a variable of the discrete domain difference equation according to the calculated duty ratio of the main switch transistor Q1, so that an output value of the adjusted discrete domain difference equation is the duty ratio or the intermediate quantity for calculating the duty ratio. For example, when the duty ratio is calculated by using the first duty ratio formula or the second duty ratio formula, because the present duty ratio is directly calculated based on the formula, a value, such as a historical output value $U(n-1), \ldots, U(n-i)$, is assigned to an adjustable variable of the discrete domain difference equation according to adjustment of the duty ratio.

It can be understood that the above synchronous switch transistor Q2 is usually switched between the on and off states, and the output current also constantly changes. The control method for a synchronous BUCK circuit can divide the control of the switch transistor into multiple branches, and uses corresponding duty ratio calculation formulas at different moments to give a predictive control value of the duty ratio, which can avoid a large dynamic impact, thereby affecting reliability and output performance of the switch transistor.

Figure 6:
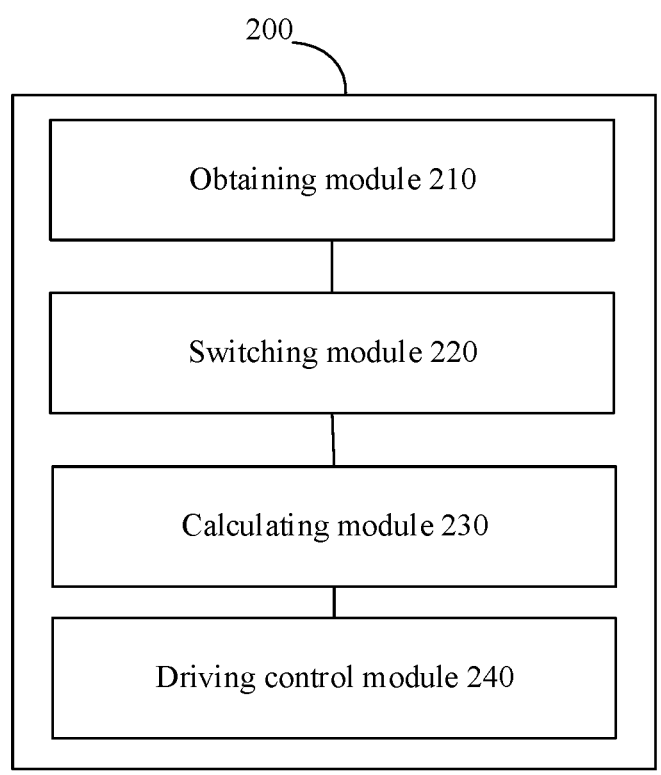
FIG. 6 is a schematic structural diagram of a control device for a synchronous BUCK circuit according to an embodiment of the present disclosure.

Referring to FIG. 6, embodiments of the present disclosure provide a control device 200 for a synchronous buck circuit to control the synchronous BUCK circuit, so as to realize power conversion. For example, as shown in FIG. 3, the synchronous BUCK circuit 100 includes a main switch transistor Q1, an inductor L, a synchronous switch transistor Q2 and an energy-storage capacitor C, where the main switch transistor Q1 has a first terminal connected to a positive electrode of a power supply BAT, a second terminal connected to a first terminal of the inductor L, and a control terminal connected to the control device 200; the synchronous switch transistor Q2 has a first terminal connected to the second terminal of the main switch transistor Q1 and the first terminal of the inductor L, a second terminal connected to a negative electrode of the power supply BAT, and a control terminal connected to the control device 200; a second terminal of the inductor L is connected to a positive electrode of the energy-storage capacitor C, a negative electrode of the energy-storage capacitor C is connected to the negative electrode of the power supply BAT, and both terminals of the energy-storage capacitor C are further connected to a load in parallel.

For example, as shown in FIG. 6, the control device 200 includes an obtaining module 210, a switching module 220, a calculating module 230, and a driving control module 240. The obtaining module 210 is configured to obtain an input voltage, an output voltage, and an output current of the synchronous BUCK circuit 100, and obtain a current state of the synchronous switch transistor Q2. The obtaining module 210 is further configured to obtain a turn-off current threshold when the synchronous switch transistor Q2 is in an on state. The switching module 220 is configured to switch the synchronous switch transistor Q2 to an off state when the output current is less than the turn-off current threshold. The calculating module 230 is configured to calculate a duty ratio of the main switch transistor Q1 according to the input voltage, the output voltage and the turn-off current threshold. The driving control module 240 is configured to generate a corresponding driving signal according to the duty ratio, to control the synchronous BUCK circuit 100.

Further, the obtaining module 210 is further configured to obtain a turn-on current threshold when the synchronous switch transistor Q2 is in the off state; the switching module 220 is further configured to switch the synchronous switch transistor Q2 to the on state when the output current is greater than the turn-on current threshold; and the calculating module 230 is further configured to calculate the duty ratio of the main switch transistor Q1 according to the input voltage and the output voltage.

Further, the synchronous BUCK circuit 100 further includes a loop compensation module, where the loop compensation module is provided with a corresponding discrete domain difference equation so as to determine the duty ratio of the main switch transistor Q1 or an intermediate quantity for solving the duty ratio.

Therefore, the switching module 220 is further configured to maintain the current state of the synchronous switch transistor Q2 when the synchronous switch transistor Q2 is in the on state and the output current is greater than or equal to the turn-off current threshold or when the synchronous switch transistor Q2 is in the off state and the output current is less than or equal to the turn-on current threshold. The calculating module 230 is further configured to calculate the duty ratio of the main switch transistor Q1 or the intermediate quantity for solving the duty ratio according to a deviation between the output voltage and a reference voltage and the discrete domain difference equation. The driving control module 240 is configured to generate the corresponding driving signal according to the duty ratio, to control the synchronous BUCK circuit 100, or generate the corresponding driving signal by using the duty ratio after the duty ratio is solved according to the intermediate quantity, to control the synchronous BUCK circuit 100. The control device may include a hardware processor or controller with a coupled memory device to perform calculation, logic, and control functions. The various modules may include dedicated hardware devices as well as program modules implemented by the processor or controller. Any appropriate processor or controller may be used.

It can be understood that the options described above are also applicable here, and therefore the description is not repeated here.

The embodiment of the present disclosure further proposes a synchronous BUCK circuit system. For example, the synchronous BUCK circuit system includes: a synchronous BUCK circuit and a control device, where the control device may adopt the control device 200 for a synchronous BUCK circuit in the above embodiment 2.

For example, as shown in FIG. 3, the synchronous BUCK circuit 100 includes a main switch transistor Q1, an inductor L, a synchronous switch transistor Q2 and an energy-storage capacitor C, where the main switch transistor Q1 has a first terminal connected to a positive electrode of a power supply BAT, a second terminal connected to a first terminal of the inductor L, and a control terminal connected to the control device 200; the synchronous switch transistor Q2 has a first terminal connected to the second terminal of the main switch transistor Q1 and the first terminal of the inductor L, a second terminal connected to a negative electrode of the power supply BAT, and a control terminal connected to the control device 200; a second terminal of the inductor L is connected to a positive electrode of the energy-storage capacitor C, a negative electrode of the energy-storage capacitor C is connected to the negative electrode of the power supply BAT, and both terminals of the energy-storage capacitor C are further connected to a load in parallel.

In one embodiment, a sampling circuit is mainly configured to sample an input voltage, an output voltage and an output current of the synchronous BUCK circuit 100, and input these sampled electrical signals to the control device 200, so that the control device 200 can control the circuit according to these sampling data. During sampling of the input voltage and the output voltage, for example, a divider resistor can be used to sample at an input end and an output end of the corresponding circuit; for the output current, for example, the output current can be sampled through a current transformer.

It can be understood that the options described above are also applicable here, and therefore the description will not be repeated here.

The embodiments of the present disclosure further provide an electronic device. For example, the electronic device includes a synchronous BUCK circuit system as in the above embodiment. For example, the electronic device may be a power supply device or the like.

In the several embodiments provided in the present disclosure, it should be understood that the disclosed device and method may be implemented in other ways. The device embodiments described above are only schematic. For example, a flowchart and a structural diagram in the accompanying drawings show architectures, functions and operations that may be realized by the devices, methods and computer program products according to the multiple embodiments of the present disclosure. At this point, each box in the flowchart or block diagram may represent a module, a program segment or part of a code, where the module, program segment or part of the code contains one or more executable instructions for realizing a specified logical function. It should also be noted that in an alternative implementation, the functions marked in the boxes may also occur in an order different from that marked in the accompanying drawings. For example, two consecutive blocks can actually be executed basically in parallel, and sometimes can also be executed in the opposite order, which depends on the functions involved. It should also be noted that each block in the structural diagram and/or flowchart and the combination of blocks in the structural diagram and/or flowchart can be implemented by a dedicated hardware-based system that performs a specified function or action, or by a combination of a dedicated hardware and a computer instruction.

In addition, functional modules or units in various embodiments of the present disclosure may be integrated together to form an independent part, or each module may exist alone, or two or more modules can be integrated to form an independent part.

The above is only the specific implementation of the present disclosure, but the protection scope of the present disclosure is not limited to this. All changes or replacements that can be easily conceived of by any person skilled the technical field within the technical scope disclosed in the present disclosure shall fall within the protection scope of the present disclosure.

What is claimed is:

1. A control method for a synchronous BUCK circuit, comprising:
    obtaining an input voltage, an output voltage and an output current of the synchronous BUCK circuit;
    obtaining a current state of a synchronous switch transistor in the synchronous BUCK circuit;
    obtaining a turn-off current threshold when the synchronous switch transistor is in an on state;
    switching the synchronous switch transistor to an off state when the output current is less than the turn-off current threshold;
    calculating a duty ratio of a main switch transistor in the synchronous BUCK circuit according to the input voltage, the output voltage and the turn-off current threshold; and
    generating a corresponding driving signal according to the duty ratio, to control the synchronous BUCK circuit, wherein the duty ratio of the main switch transistor is calculated according to the input voltage, the output voltage and the turn-off current threshold based on a first duty ratio formula; and the first duty ratio formula is:

$$D = \frac{V_{out}}{V_{in} - V_{out}} \sqrt{\frac{2L \cdot I_x}{V_{out} \cdot T_s}},$$

wherein D is the duty ratio of the main switch transistor; $V_{in}$ is a currently sampled input voltage; $V_{out}$ is a currently sampled output voltage; L is an inductance value of an inductor in the synchronous BUCK circuit; $I_x$ is the turn-off current threshold; and $T_s$ is a switching cycle of the main switch transistor.

2. The method according to claim 1, further including:
    obtaining a turn-on current threshold when the synchronous switch transistor is in the off state;
    switching the synchronous switch transistor to the on state when the output current is greater than the turn-on current threshold;
    calculating the duty ratio of the main switch transistor according to the input voltage and the output voltage; and
    generating the corresponding driving signal according to the duty ratio, to control the synchronous BUCK circuit.

3. The method according to claim 2, wherein the duty ratio of the main switch transistor is calculated according to the input voltage and the output voltage based on a second duty ratio formula; and the second duty ratio formula is:

$$D = \frac{V_{out}}{V_{in}},$$

wherein D is the duty ratio of the main switch transistor; $V_m$ is a currently sampled input voltage; and $V_{out}$ is a currently sampled output voltage.

4. The method according to claim 2, wherein the synchronous BUCK circuit further comprises a loop compensation module, and the loop compensation module is provided with a corresponding discrete domain difference equation so as to determine the duty ratio of the main switch transistor or an intermediate quantity for solving the duty ratio; and the method further comprises:
    maintaining a current state of the synchronous switch transistor when the synchronous switch transistor is in the on state and the output current is greater than or equal to the turn-off current threshold;
    calculating the duty ratio of the main switch transistor or the intermediate quantity for solving the duty ratio according to a deviation between the output voltage and a reference voltage and the discrete domain difference equation; and generating the corresponding driving signal according to the duty ratio, to control the synchronous BUCK circuit, or generating the corresponding driving signal by using the duty ratio after the duty ratio is solved according to the intermediate quantity, to control the synchronous BUCK circuit.

5. The method according to claim 4, wherein the method further comprises:
maintaining the current state of the synchronous switch transistor when the synchronous switch transistor is in the off state and the output current is less than or equal to the turn-on current threshold;
calculating the duty ratio of the main switch transistor or the intermediate quantity for solving the duty ratio according to the deviation between the output voltage and the reference voltage and the discrete domain difference equation; and
generating the corresponding driving signal according to the duty ratio, to control the synchronous BUCK circuit, or generating the corresponding driving signal by using the duty ratio after the duty ratio is solved according to the intermediate quantity, to control the synchronous BUCK circuit.

6. The method according to claim 4, wherein an expression of the discrete domain difference equation is:

$$U(n) = A_1 U(n-1) + \ldots + A_i U(n-i) + B_1 E(n) + B_2 E(n-1) + \ldots + B_j E(n-j),$$

wherein U represents the duty ratio or the intermediate quantity for calculating the duty ratio; n represents a current sample; n−1 represents a previous sample; E represents the deviation between the output voltage and the reference voltage; i and j are integers greater than or equal to 2; and $A_1$, $A_i$, $B_1$, $B_2$ and $B_j$ represent gain coefficients of corresponding terms respectively.

7. The method according to claim 4, wherein after the calculating the duty ratio of the main switch transistor according to the input voltage, the output voltage and the turn-off current threshold, the method further comprises:
adjusting a variable of the discrete domain difference equation according to the calculated duty ratio of the main switch transistor, so that an output value of the adjusted discrete domain difference equation is the duty ratio or the intermediate quantity for calculating the duty ratio.

8. The method according to claim 4, wherein after the calculating the duty ratio of the main switch transistor according to the input voltage and the output voltage, the method further comprises:
adjusting a variable of the discrete domain difference equation according to the calculated duty ratio of the main switch transistor, so that an output value of the adjusted discrete domain difference equation is the duty ratio or the intermediate quantity for calculating the duty ratio.

9. The method according to claim 4, wherein the loop compensation module comprises a loop controller adopting PI control, PD control or PID control.

10. A synchronous BUCK circuit system, comprising:
a synchronous BUCK circuit and a control device, wherein
the control device is configured to control the synchronous BUCK circuit; and the synchronous BUCK circuit comprises:
a main switch transistor, an inductor, a synchronous switch transistor, an energy-storage capacitor and a sampling circuit, wherein:
the sampling circuit is configured to collect an input voltage, an output voltage and an output current of the synchronous BUCK circuit and output to the control device;
the main switch transistor has a first terminal connected to a positive electrode of a power supply, a second terminal connected to a first terminal of the inductor, and a control terminal connected to the control device;
the synchronous switch transistor has a first terminal connected to the second terminal of the main switch transistor and the first terminal of the inductor, a second terminal connected to a negative electrode of the power supply, and a control terminal connected to the control device;
a second terminal of the inductor is connected to a positive electrode of the energy-storage capacitor, a negative electrode of the energy-storage capacitor is connected to the negative electrode of the power supply, and both terminals of the energy-storage capacitor are further connected to a load in parallel, and
wherein the control device comprises:
an obtaining module, configured to obtain the input voltage, the output voltage and the output current of the synchronous BUCK circuit, obtain a current state of the synchronous switch transistor in the synchronous BUCK circuit, and further obtain a turn-off current threshold when the synchronous switch transistor is in an on state;
a switching module, configured to switch the synchronous switch transistor to an off state when the output current is less than the turn-off current threshold;
a calculating module, configured to calculate a duty ratio of the main switch transistor in the synchronous BUCK circuit according to the input voltage, the output voltage and the turn-off current threshold; and
a driving control module, configured to generate a corresponding driving signal according to the duty ratio, to control the synchronous BUCK circuit,
wherein the calculating module calculates the duty ratio of the main switch transistor according to the input voltage, the output voltage and the turn-off current threshold based on a first duty ratio formula; and the first duty ratio formula is:

$$D = \frac{V_{out}}{V_{in} - V_{out}} \sqrt{\frac{2L \cdot I_x}{V_{out} \cdot T_s}},$$

wherein D is the duty ratio of the main switch transistor; $V_{in}$ is a currently sampled input voltage; $V_{out}$ is a currently sampled output voltage; L is an inductance value of an inductor in the synchronous BUCK circuit; $I_x$ is the turn-off current threshold; and $T_s$ is a switching cycle of the main switch transistor.

11. The synchronous BUCK circuit system according to claim 10, wherein
the obtaining module is further configured to obtain a turn-on current threshold when the synchronous switch transistor is in the off state;
the switching module is further configured to switch the synchronous switch transistor to the on state when the output current is greater than the turn-on current threshold;

the calculating module is further configured to calculate a duty ratio of the main switch transistor according to the input voltage and the output voltage; and the driving control module is further configured to generate a corresponding driving signal according to the duty ratio, to control the synchronous BUCK circuit.

12. The synchronous BUCK circuit system according to claim 11, wherein the calculating module calculates the duty ratio of the main switch transistor according to the input voltage and the output voltage based on a second duty ratio formula; and the second duty ratio formula is:

$$D = \frac{V_{out}}{V_{in}},$$

wherein D is the duty ratio of the main switch transistor; $V_{in}$ is a currently sampled input voltage; and $V_{out}$ is a currently sampled output voltage.

13. The synchronous BUCK circuit system according to claim 11, wherein the synchronous BUCK circuit further comprises a loop compensation module, and the loop compensation module is provided with a corresponding discrete domain difference equation so as to determine the duty ratio of the main switch transistor or an intermediate quantity for solving the duty ratio;

the switching module is further configured to maintain a current state of the synchronous switch transistor when the synchronous switch transistor is in the on state and the output current is greater than or equal to the turn-off current threshold;

the calculating module is further configured to calculate the duty ratio of the main switch transistor or the intermediate quantity for solving the duty ratio according to a deviation between the output voltage and a reference voltage and the discrete domain difference equation; and the driving control module is further configured to generate the corresponding driving signal according to the duty ratio, to control the synchronous BUCK circuit, or generate the corresponding driving signal by using the duty ratio after the duty ratio is solved according to the intermediate quantity, to control the synchronous BUCK circuit.

14. The synchronous BUCK circuit system according to claim 13, wherein an expression of the discrete domain difference equation is:

$$U(n)=A_1U(n-1)+ \quad . \quad . \quad . \quad +A_iU(n-i)+B_1E(n)+B_2 E(n-1)+ \ldots +B_jE(n-j),$$

wherein U represents the duty ratio or the intermediate quantity for calculating the duty ratio; n represents a current sample; n−1 represents a previous sample; E represents the deviation between the output voltage and the reference voltage; i and j are integers greater than or equal to 2; and $A_1$, $A_i$, $B_1$, $B_2$ and $B_j$ represent gain coefficients of corresponding terms respectively.

15. The synchronous BUCK circuit system according to claim 13, wherein the calculating module, after calculating the duty ratio of the main switch transistor according to the input voltage, the output voltage and the turn-off current threshold, or after calculating the duty ratio of the main switch transistor according to the input voltage and the output voltage, is further configured to:

adjust a variable of the discrete domain difference equation according to the obtained duty ratio of the main switch transistor, so that an output value of the adjusted discrete domain difference equation is the duty ratio or the intermediate quantity for calculating the duty ratio.

16. An electronic device, comprising a synchronous BUCK circuit system according to claim 10.

* * * * *